US008832216B2

(12) United States Patent
Bugge

(10) Patent No.: US 8,832,216 B2
(45) Date of Patent: Sep. 9, 2014

(54) METHOD AND SYSTEM FOR CONDITIONAL REMOTE DIRECT MEMORY ACCESS WRITE

(75) Inventor: Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 571 days.

(21) Appl. No.: 13/221,958

(22) Filed: Aug. 31, 2011

(65) Prior Publication Data
US 2013/0054726 A1 Feb. 28, 2013

(51) Int. Cl.
G06F 15/167 (2006.01)
G06F 15/177 (2006.01)
G06F 9/52 (2006.01)
G06F 15/173 (2006.01)
G06F 13/28 (2006.01)

(52) U.S. Cl.
CPC ............ *G06F 9/52* (2013.01); *G06F 15/17331* (2013.01); *G06F 13/28* (2013.01)
USPC .......................................... 709/212; 709/222

(58) Field of Classification Search
CPC ........................... G06F 13/28; G06F 15/17331
USPC .................................................. 709/212, 222
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,851,059 B1 * | 2/2005 | Pfister et al. ..................... | 726/10 |
| 6,917,987 B2 * | 7/2005 | Parthasarathy et al. ........ | 709/249 |
| 7,010,607 B1 * | 3/2006 | Bunton ......................... | 709/228 |
| 7,099,955 B1 * | 8/2006 | Gregg et al. .................. | 709/238 |
| 7,133,405 B2 * | 11/2006 | Graham et al. ............... | 370/392 |
| 7,136,353 B2 | 11/2006 | Ha et al. | |
| 7,281,030 B1 * | 10/2007 | Davis ........................... | 709/212 |
| 7,290,051 B2 * | 10/2007 | Dobric et al. ................. | 709/224 |
| 7,330,918 B2 | 2/2008 | Yamamoto et al. | |
| 7,409,432 B1 * | 8/2008 | Recio et al. .................. | 709/209 |
| 7,478,138 B2 * | 1/2009 | Chang et al. ................. | 709/212 |
| 7,496,698 B2 | 2/2009 | Biran et al. | |
| 7,587,575 B2 * | 9/2009 | Moertl et al. ................. | 711/206 |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

*Primary Examiner* — Hieu Hoang
(74) *Attorney, Agent, or Firm* — Osha Liang LLP

(57) ABSTRACT

A method for conditional execution of a remote direct memory access (RDMA) write includes a host channel adapter receiving at least one message that includes an atomic operation and the RDMA write. The host channel adapter obtains a descriptor corresponding to the RDMA write, and determines, from the descriptor, that the RDMA write is a conditional RDMA write conditioned on a successful execution of the atomic operation. Based on determining that the RDMA write is the conditional RDMA write, the conditional RDMA write is queued to be conditionally executed based on a success indicator of the atomic operation. After queuing the RDMA write, the atomic operation is executed successfully. In response to the successful execution, the host channel adapter executes the conditional RDMA write to write to the memory location on the host.

20 Claims, 6 Drawing Sheets

(56) References Cited

U.S. PATENT DOCUMENTS

| | | | |
|---|---|---|---|
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,865,633 B2* | 1/2011 | Wilkinson | 710/33 |
| 7,899,050 B2 | 3/2011 | Craddock et al. | |
| 8,090,801 B1* | 1/2012 | Pillai et al. | 709/219 |
| 8,244,946 B2 | 8/2012 | Gupta et al. | |
| 8,249,072 B2* | 8/2012 | Sugumar et al. | 370/392 |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 8,686,838 B1* | 4/2014 | Eiriksson et al. | 340/407.1 |
| 2001/0036185 A1 | 11/2001 | Dempo | |
| 2002/0091852 A1* | 7/2002 | Frazier et al. | 709/232 |
| 2002/0124148 A1* | 9/2002 | Beukema et al. | 711/163 |
| 2002/0133620 A1* | 9/2002 | Krause | 709/238 |
| 2002/0141424 A1* | 10/2002 | Gasbarro et al. | 370/412 |
| 2002/0152328 A1* | 10/2002 | Kagan et al. | 709/250 |
| 2002/0191599 A1* | 12/2002 | Parthasarathy et al. | 370/389 |
| 2003/0093627 A1* | 5/2003 | Neal et al. | 711/153 |
| 2003/0101158 A1 | 5/2003 | Pinto et al. | |
| 2004/0049600 A1* | 3/2004 | Boyd et al. | 709/250 |
| 2004/0136325 A1* | 7/2004 | Dobric et al. | 370/241 |
| 2004/0215848 A1* | 10/2004 | Craddock et al. | 710/39 |
| 2005/0018669 A1 | 1/2005 | Arndt et al. | |
| 2005/0060443 A1 | 3/2005 | Rosner | |
| 2005/0100033 A1* | 5/2005 | Arndt et al. | 370/412 |
| 2005/0135419 A1 | 6/2005 | Pullen et al. | |
| 2005/0223118 A1 | 10/2005 | Tucker et al. | |
| 2006/0020598 A1* | 1/2006 | Shoolman et al. | 707/8 |
| 2006/0034283 A1* | 2/2006 | Ko et al. | 370/392 |
| 2006/0075067 A1* | 4/2006 | Blackmore et al. | 709/217 |
| 2006/0095606 A1* | 5/2006 | Emmes et al. | 710/46 |
| 2007/0008886 A1 | 1/2007 | Chen et al. | |
| 2007/0019665 A1 | 1/2007 | Benveniste | |
| 2007/0041383 A1* | 2/2007 | Banikazemi et al. | 370/395.3 |
| 2007/0165672 A1 | 7/2007 | Keels et al. | |
| 2007/0223472 A1 | 9/2007 | Tachibana et al. | |
| 2007/0223483 A1 | 9/2007 | Huang et al. | |
| 2007/0239905 A1* | 10/2007 | Banerjee et al. | 710/22 |
| 2007/0242686 A1 | 10/2007 | Zegers et al. | |
| 2008/0013448 A1* | 1/2008 | Horie et al. | 370/229 |
| 2008/0126509 A1* | 5/2008 | Subramanian et al. | 709/214 |
| 2008/0140984 A1 | 6/2008 | Shearer | |
| 2008/0168194 A1 | 7/2008 | Gregg et al. | |
| 2009/0106771 A1* | 4/2009 | Benner et al. | 719/313 |
| 2009/0125604 A1 | 5/2009 | Chang et al. | |
| 2009/0144383 A1* | 6/2009 | Elnozahy et al. | 709/206 |
| 2009/0172301 A1* | 7/2009 | Ebersole et al. | 711/154 |
| 2010/0049821 A1* | 2/2010 | Oved | 709/212 |
| 2011/0216648 A1 | 9/2011 | Mehrotra et al. | |
| 2012/0239832 A1 | 9/2012 | Subramanian et al. | |
| 2013/0024645 A1* | 1/2013 | Cheriton et al. | 711/206 |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

\* cited by examiner

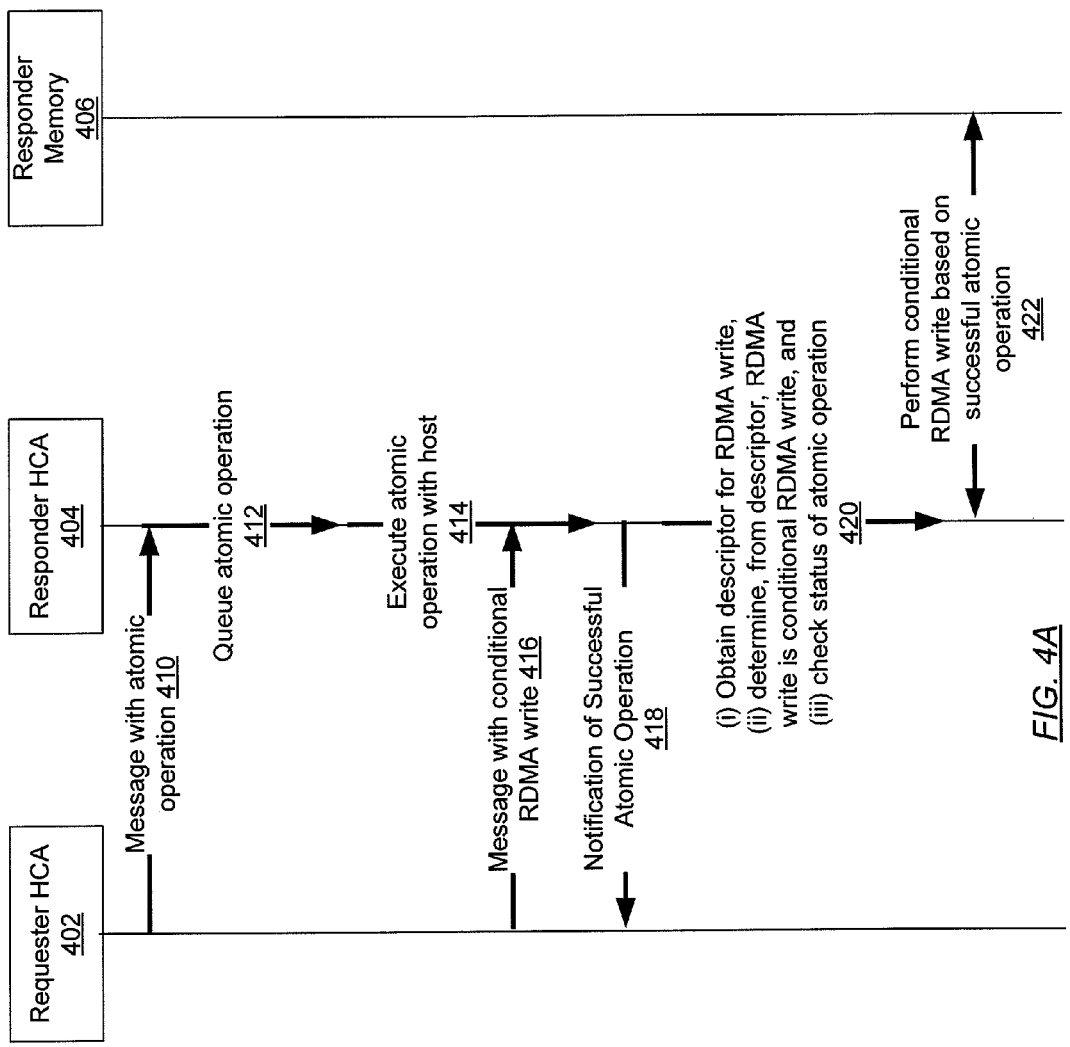

METHOD AND SYSTEM FOR CONDITIONAL REMOTE DIRECT MEMORY ACCESS WRITE

BACKGROUND

Cluster computing typically includes Computer Interconnect Systems that provide functionality for Remote Direct Memory Access (RDMA). In order to provide reliable, remote memory operations, entities of the cluster may employ a reliable transfer protocol. The reliable transfer protocol may be implemented in software, firmware, hardware, or any combination thereof.

Some memory operations, such as a remote memory read, are idempotent, which means that such memory operations may be executed more than one time and still achieve the same result. Other memory operations are atomic, which means that such memory operations must execute exactly one time. In order to reliably execute atomic operations, the responder of the reliable transfer protocol should maintain a certain state associated with prior executed atomic operations. This state includes information required to re-generate the result of the operation sent back to the requester. If a request packet is lost or damaged in transit from the requester to the responder, the responder may either discard the packet because it is damaged or not receive the packet at all. In either case, the responder typically does not send a response to the requester. Rather, the reliable transfer protocol on the requester system will time out and re-send the packet. The re-sent packet will eventually be received by the responder, and the responder may then process the atomic operation, preserve the required state, and send a response to the responder with the result of the atomic operation.

If the response is damaged or lost, the requester will not receive a good response, and the reliable transfer protocol on the requester system will time out and re-send the packet. When this request packet is processed by the responder, the responder may detect that it is a duplicate request and use the already saved information to re-generate the correct result of the previously executed atomic operation.

SUMMARY

In general, in one aspect, the invention relates to a method for conditional execution of a remote direct memory access (RDMA) write. The method includes a host channel adapter receiving at least one message that includes an atomic operation and the RDMA write from a requester system. The RDMA write is to write to a memory location on a host connected to the host channel adapter. The host channel adapter obtains a descriptor corresponding to the RDMA write, and determines, from the descriptor, that the RDMA write is a conditional RDMA write conditioned on a successful execution of the atomic operation. Based on determining that the RDMA write is the conditional RDMA write, after receiving the at least one message, the conditional RDMA write is queued to be conditionally executed based on a success indicator of the atomic operation. After queuing the RDMA write, the atomic operation is executed successfully. The host channel adapter maintains a state of the atomic operation by setting the success indicator to indicate the successful execution of the atomic operation when execution of the atomic operation is successfully completed. In response to setting the success indicator to indicate the successful execution, the host channel adapter executes the conditional RDMA write to write to the memory location on the host.

In general, in one aspect, the invention relates to a responder communication adapter for conditional execution of a remote direct memory access (RDMA) write. The responder communication adapter includes a network port that includes functionality to receive at least one message comprising a request to perform an atomic operation and the RDMA write from a requester system. The RDMA write is to write to a memory location on a host connected to the host channel adapter. The responder communication adapter further includes processing logic. The processing logic is configured to obtain a descriptor corresponding to the RDMA write, determine, from the descriptor, that the RDMA write is a conditional RDMA write conditioned on a successful execution of the atomic operation, queue, after receiving the at least one message, the conditional RDMA write to be conditionally executed based on a success indicator of the atomic operation, execute, after queuing the RDMA write, the atomic operation resulting in the successful execution, maintain a state of the atomic operation by setting the success indicator to indicate the successful execution of the atomic operation when execution of the atomic operation is successfully completed, and, in response to setting the success indicator to indicate the successful execution, execute the conditional RDMA write to write to the memory location on the host.

In general, in one aspect, the invention relates to a non-transitory computer readable medium storing instructions for a conditional remote direct memory access (RDMA) write. The instructions include functionality for causing a computer system to receive at least one message that includes an atomic operation and the RDMA write from a requester system. The RDMA write is to write to a memory location on a host connected to a host channel adapter. The instructions further include functionality for causing a computer system to obtain a descriptor corresponding to the RDMA write, determine, from the descriptor, that the RDMA write is a conditional RDMA write conditioned on a successful execution of the atomic operation, queue, after receiving the at least one message, the conditional RDMA write to be conditionally executed based on a success indicator of the atomic operation, execute, after queuing the RDMA write, the atomic operation resulting in the successful execution, maintain a state of the atomic operation by setting the success indicator to indicate the successful execution of the atomic operation when execution of the atomic operation is successfully completed, and, in response to setting the success indicator to indicate the successful execution, execute the conditional RDMA write to write to the memory location on the host.

Other aspects of the invention will be apparent from the following description and the appended claims.

BRIEF DESCRIPTION OF DRAWINGS

FIGS. 4A-4B show examples in one or more embodiments of the invention.

DETAILED DESCRIPTION

Figure 1:
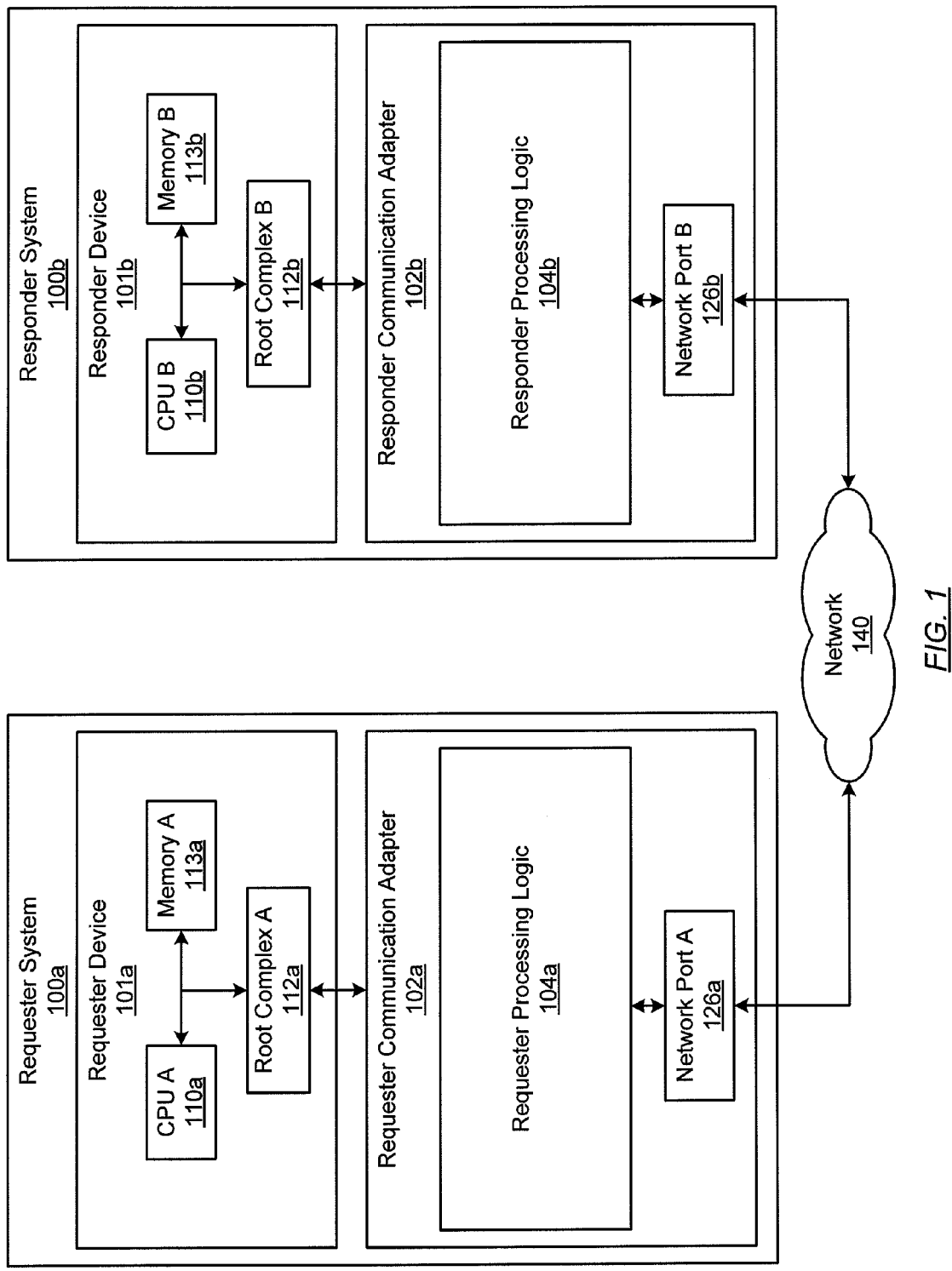
FIGS. 1-2 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid unnecessarily complicating the description.

In general, embodiments of the invention provide a method and an apparatus for a conditional remote direct memory access ("RDMA") write. Specifically, embodiments of the invention perform conditional RDMA writes based on the success of an atomic operation. The success of the atomic operation may be monitored using a success bit. The success bit may be stored with the state used to replay the atomic operation in the event of packet loss. Other methods for storing the success and/or failure of the atomic operation may be used without departing from the invention.

FIG. 1 shows a schematic diagram of a communication system in one or more embodiments of the invention. In one or more embodiments of the invention, the communication system includes a requester system (100a) and a responder system (100b). The requester system (100a) and responder system (100b) may be any type of physical computing device connected to a network (140). The network may be any type of network, such as an Infiniband® network, a local area network, a wide area network (e.g., Internet), or any other network now known or later developed. By way of an example of the requester system (100a) and the responder system (100b), the requester system (100a) and/or a responder system (100b) may be a host system, a storage device, or any other type of computing system. For example, the requester system (100a) and/or the responder system (100b) may be a database server. In one or more embodiments of the invention, for a particular communication requesting an atomic operation and a conditional RDMA write, the requester system (100a) is a system that sends the request(s) and the responder system (100b) is a system that receives and processes the request(s). In other words, the use of the words, "requesting" and "responder", refer to the roles of the respective systems for a particular communication. The roles may be reversed for another communication, such as request(s) sent from responder system (100b) to requester system (100a). For such requests, the responder system (100b) is a requester system and the requester system (100a) is a responder system. Thus, communication may be bi-directional in one or more embodiments of the invention.

In one or more embodiments of the invention, the requester system (100a) includes a device (e.g., requesting device (101a), responder device (101b)) and a communication adapter (e.g., requester communication adapter (102a), responder communication adapter (102b)). The device and the communication adapter are discussed below.

In one or more embodiments of the invention, the device (e.g., requesting device (101a), responder device (101b)) includes at least a minimum amount of hardware necessary to process instructions. As shown in FIG. 1, the device includes hardware, such as a central processing unit ("CPU") (e.g., CPU A (110a), CPU B (110b)), memory (e.g., memory A (113a), memory B (113b)), and a root complex (e.g., root complex A (112a), root complex B (112b)). In one or more embodiments of the invention, the CPU is a hardware processor component for processing instructions of the device. The CPU may include multiple hardware processors. Alternatively or additionally, each hardware processor may include multiple processing cores in one or more embodiments of the invention. In general, the CPU is any physical component configured to execute instructions on the device. Although not shown in FIG. 1, the requesting device (101a) and/or responder device (101b) may include software, such as operating system(s), virtual machine manager(s), application(s), or any other type of software.

In one or more embodiments of the invention, the memory is any type of physical hardware component for storage of data. In one or more embodiments of the invention, the memory may be partitioned into separate spaces for virtual machines. In one or more embodiments, the memory further includes a payload for requesting on the network (140) or received from the network (140) and consumed by the CPU.

Continuing with FIG. 1, in one or more embodiments of the invention, the communication adapter (e.g., requester communication adapter (102a), responder communication adapter (102b)) is a physical hardware component configured to connect the corresponding device to the network (140). Specifically, the communication adapter is a hardware interface component between the corresponding device and the network. In one or more embodiments of the invention, the communication adapter is connected to the corresponding device using a peripheral component interconnect (PCI) express connection or another connection mechanism. For example, the communication adapter may correspond to a network interface card, an Infiniband® channel adapter (e.g., target channel adapter, host channel adapter), or any other interface component for connecting the device to the network. Each communication adapter (e.g., requester communication adapter (102a), responder communication adapter (102b)) includes at least one network port (e.g., network port A (126a), network port B (126b)). The network port is a physical interface connection to connect the respective communication adapter to the network (140).

In one or more embodiments of the invention, the communication adapter includes logic (e.g., requester processing logic (104a), responder processing logic (104b)) for performing the role of the communication adapter with respect to the requests. Specifically, the requester communication adapter (102a) includes requester processing logic (104a) and the responder communication adapter (102b) includes responder processing logic (104b) in one or more embodiments of the invention. Although not shown in FIG. 1, the requester communication adapter (102a) and/or responder communication adapter (102b) may also include responder processing logic and requester processing logic, respectively, without departing from the scope of the invention. The requester processing logic (104a) and the responder processing logic (104b) are discussed below.

In one or more embodiments of the invention, the requester processing logic (104a) corresponds to hardware, software, and/or firmware. For example, the requester processing logic (104a) may include dedicated hardware, an embedded processor, and/or software or firmware. In one or more embodiments of the invention, the requester processing logic (104a) includes functionality to receive commands from the requesting device and process the commands. Processing the commands may include performing a direct memory access ("DMA") with memory A (113a) to obtain and store a payload and to obtain control information, performing any validation required on the payload, generating packets from the payload, and sending and receiving payload on the network (140). In one or more embodiments of the invention, the payload may include at least one request for an RDMA write and/or an atomic operation for execution at the responder system (100b). By way of an example, the requester processing logic for an Infiniband® network is discussed in further detail in FIG. 2 below.

Continuing with FIG. 1, in one or more embodiments of the invention, the responder processing logic (104b) corresponds to hardware, software, and/or firmware. For example, the responder processing logic (104b) may include dedicated hardware, an embedded processor, and/or software or firmware. In one or more embodiments of the invention, the responder processing logic (104b) includes functionality to receive the packets via the network (140) and the network port (126b) from the requester system (100a). The responder processing logic (104b) may include functionality to process and/or forward the messages to the responder device (101b).

Moreover, in one or more embodiments of the invention, the responder processing logic (104b) includes functionality to perform atomic operations and DMA operations with the memory B (113b). The DMA operations may include performing remote DMA (RDMA) on behalf of the requester system (100a). An RDMA operation is a direct memory access of memory of a remote system's memory (e.g., memory B (113b)) that is performed independently of the requester system's (100a) and the remote system's operating systems (not shown). In other words, the RDMA operation is performed by the responder processing logic (104b) independent of the CPU B (110b) and CPU A (110a).

An atomic operation is a set of operations that are performed together. In other words, both operations are performed together as if the operations are a single operation. Specifically, atomic operations are combinations of read, modify, and writes, where the combinations are guaranteed to be completely executed without other operations being executed on the same location(s) of memory. Examples of atomic operations include, but are not limited to, a fetch-and-add operation and a compare-and-swap operation. A compare-and-swap operation is performed by a responder communication adapter (102b) to determine whether the contents of a memory location and a requested value in the compare-and-swap operation are equal, and if the contents and requested value are equal, set the contents of the memory location to a new value. Because the compare-and-swap operation is performed atomically, the new value is guaranteed to be calculated using the appropriate value (e.g., the value is not updated by another thread while the compare-and-swap operation is performed). Although the above discusses the compare-and-swap atomic operation and the fetch-and-add atomic operation, other atomic operations may be requested by the requester system without departing from the invention.

In one or more embodiments of the invention, the responder communication adapter (102b) includes functionality to receive a conditional RDMA write and execute the conditional RDMA write only if a prior executed atomic operation is successful. In one or more embodiments of the invention, the responder communication adapter (102b) includes functionality to maintain a success indicator. A success indicator is any mechanism for storing the success of an atomic operation. For example, the success indicator may be associated with a communication channel, such as a queue pair or session identifier, identified in a message having the atomic operation. In one or more embodiments of the invention, the success indicator may be set to indicate atomic operation is successfully completed. For example, one type of success indicator is a success bit. A success bit may be a single bit that is associated with the atomic operation and set to true when the atomic operation is successfully completed. The success bit may be set to false when the atomic operation is in progress or not successfully completed. For example, the success bit may be associated with the communication channel and/or a message identifier of the atomic operation. Other success indicators may be used without departing from the invention.

Figure 2:
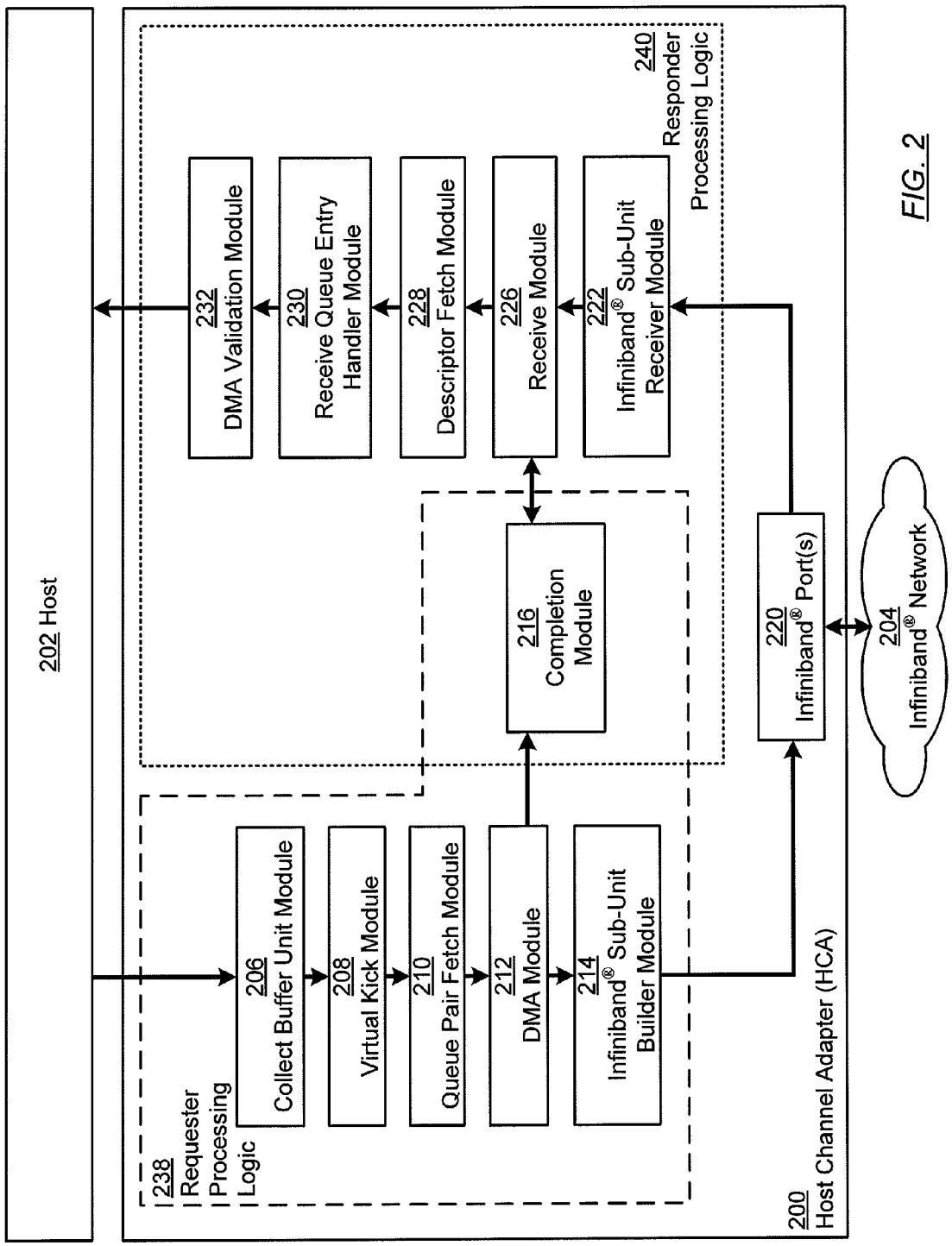

As discussed above, FIG. 1 shows a communication system for transmitting and receiving messages. FIG. 2 shows a schematic diagram of a communication adapter when the communication adapter is a host channel adapter (200) and the network is an Infiniband® network in one or more embodiments of the invention.

As shown in FIG. 2, the host channel adapter (200) may include a collect buffer unit module (206), a virtual kick module (208), a queue pair fetch module (210), a direct memory access (DMA) module (212), an Infiniband® sub-unit builder module (214), one or more Infiniband® ports (220), a completion module (216), an Infiniband® sub-unit receiver module (222), a receive module (226), a descriptor fetch module (228), a receive queue entry handler module (230), and a DMA validation module (232). In the host channel adapter of FIG. 2, the host channel adapter includes both requester processing logic (238) for sending messages on the Infiniband® network (204) and responder processing logic (240) for responder messages from the Infiniband® network (204). In one or more embodiments of the invention, the collect buffer unit module (206), virtual kick module (208), queue pair fetch module (210), direct memory access (DMA) module (212), Infiniband® sub-unit builder module (214), and completion module (216) may be components of the requester processing logic (238). The completion module (216), Infiniband® sub-unit receiver module (222), receive module (226), descriptor fetch module (228), receive queue entry handler module (230), and the DMA validation module (232) may be components of the responder processing logic (240). As shown, the completion module (216) may be considered a component of both the requester processing logic (238) and the responder processing logic (240) in one or more embodiments of the invention.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message.

The dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer unit module (206) includes functionality to receive command data from the host (202) and store the command data on the host channel adapter (200). Specifically, the collect buffer unit module (206) is connected to the host (202) and is configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the requester processing logic (238) in accordance with a load balancing protocol.

In one or more embodiments of the invention, the queue pair fetch module (210) includes functionality to obtain queue pair status information for the queue pair corresponding to the data unit. Specifically, per the Infiniband® protocol, the message has a corresponding send queue and a receive queue. The send queue and receive queue form a queue pair. Accordingly, the queue pair corresponding to the message is the queue pair corresponding to the data unit in one or more embodiments of the invention. The queue pair state information may include, for example, sequence number, address of remote receive queue/send queue, whether the queue pair is allowed to send or allowed to receive, and other state information.

In one or more embodiments of the invention, the DMA module (212) includes functionality to perform DMA with host memory. The DMA module may include functionality to determine whether a command in a data unit or referenced by a data unit identifies a location in host memory that includes payload. The DMA module may further include functionality to validate that the process sending the command has necessary permissions to access the location, obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® sub-unit builder module (214). In one or more embodiments of the invention, the Infiniband® sub-unit builder module includes functionality to generate one or more sub-units for each data unit and to initiate transmission of the one or more sub-units on the Infiniband® network (204) via the Infiniband® port(s) (220). In the process of generating the sub-units, the Infiniband® sub-unit builder module may include functionality to dynamically adjust the MTU, and divide the message into sub-units according to the dynamically adjusted MTU. In one or more embodiments of the invention, the Infiniband® sub-unit builder module may include functionality to obtain the payload from a buffer corresponding to the data unit, from the host memory, and from an embedded processor subsystem memory.

In one or more embodiments of the invention, the completion module (216) includes functionality to manage sub-units for queue pairs set in reliable transmission mode. Specifically, in one or more embodiments of the invention, when a queue pair is in a reliable transmission mode, then the responder channel adapter of a new sub-unit responds to the new sub-unit with an acknowledgement message indicating that transmission completed or an error message indicating that transmission failed. The completion module (216) includes functionality to manage data units corresponding to sub-units until an acknowledgement is received or transmission is deemed to have failed (e.g., by a timeout).

Additionally, in one or more embodiments of the invention, the completion module is configured to store, for each atomic operation executed by the responder communication adapter, which by the atomic operation's nature or through a predetermined convention has a success or failure status, a success indicator indicating whether the atomic operation is successfully completed.

In one or more embodiments of the invention, the Infiniband® sub-unit receiver module (222) includes functionality to receive sub-units from the Infiniband® port(s) (220). In one or more embodiments of the invention, the Infiniband® sub-unit receiver module (222) includes functionality to perform a checksum to verify that the sub-unit is correct, parse the headers of the received sub-units, and place the payload of the sub-unit in memory. In one or more embodiments of the invention, the Infiniband® sub-unit receiver module (222) includes functionality to obtain the queue pair state for each sub-unit from a queue pair state cache. In one or more embodiments of the invention, the Infiniband® sub-unit receiver module includes functionality to transmit a data unit for each sub-unit to the receive module (226) for further processing.

In one or more embodiments of the invention, the receive module (226) includes functionality to validate the queue pair state obtained for the sub-unit. The receive module (226) includes functionality to determine whether the sub-unit should be accepted for processing. In one or more embodiments of the invention, if the sub-unit corresponds to an acknowledgement or an error message for a sub-unit sent by the host channel adapter (200), the receive module includes functionality to update the completion module (216).

Additionally or alternatively, the receive module (226) includes a queue that includes functionality to store data units waiting for one or more references to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. In one or more embodiments of the invention, a descriptor provides information, such as state information, about a queue pair. A single queue pair may have multiple descriptors. In one or more embodiments of the invention, descriptors may be stored in the host. A cache of descriptors may be maintained on the host channel adapter.

In one or more embodiments of the invention, an RDMA operation references, directly or indirectly, a descriptor. The descriptor specifies a condition of being dependent on an atomic operation. The descriptor is defined by software on the responder device. For example, software that is the receiver of communications for a queue pair may define descriptors.

Thus, issuing an RDMA write by a requester system that is directed to a descriptor implicitly issues the RDMA write as a conditional RDMA write. In one or more embodiments of the invention, the descriptor fetch module includes functionality to obtain the descriptor for the RDMA write. Additionally or alternatively, in one or more embodiments of the invention, another module may obtain the descriptor for RDMA writes. Alternatively, the RDMA write may include an opcode specifying that it is a conditional RDMA write or the address of the memory location written to in the RDMA write may set the RDMA write as a conditional RDMA write.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA, including RDMA, between the host channel adapter and the host memory. The DMA validation module includes functionality to confirm that the remote process that sent the sub-unit has permission to write to the buffer(s) referenced by the buffer references, and confirm that the address and the size of the buffer(s) match the address and size of the memory region referenced in the sub-unit. Additionally, in one or more embodiments of the invention, the DMA validation module may include functionality to determine whether an atomic operation is successfully completed and perform a conditional RDMA write when the atomic operation is successfully completed. Further, in one or more embodiments of the invention, the DMA validation module (232) includes functionality to initiate DMA with host memory when the DMA is validated (e.g., by having necessary permissions and by confirming that the atomic operation is successfully completed).

Figure 3A:
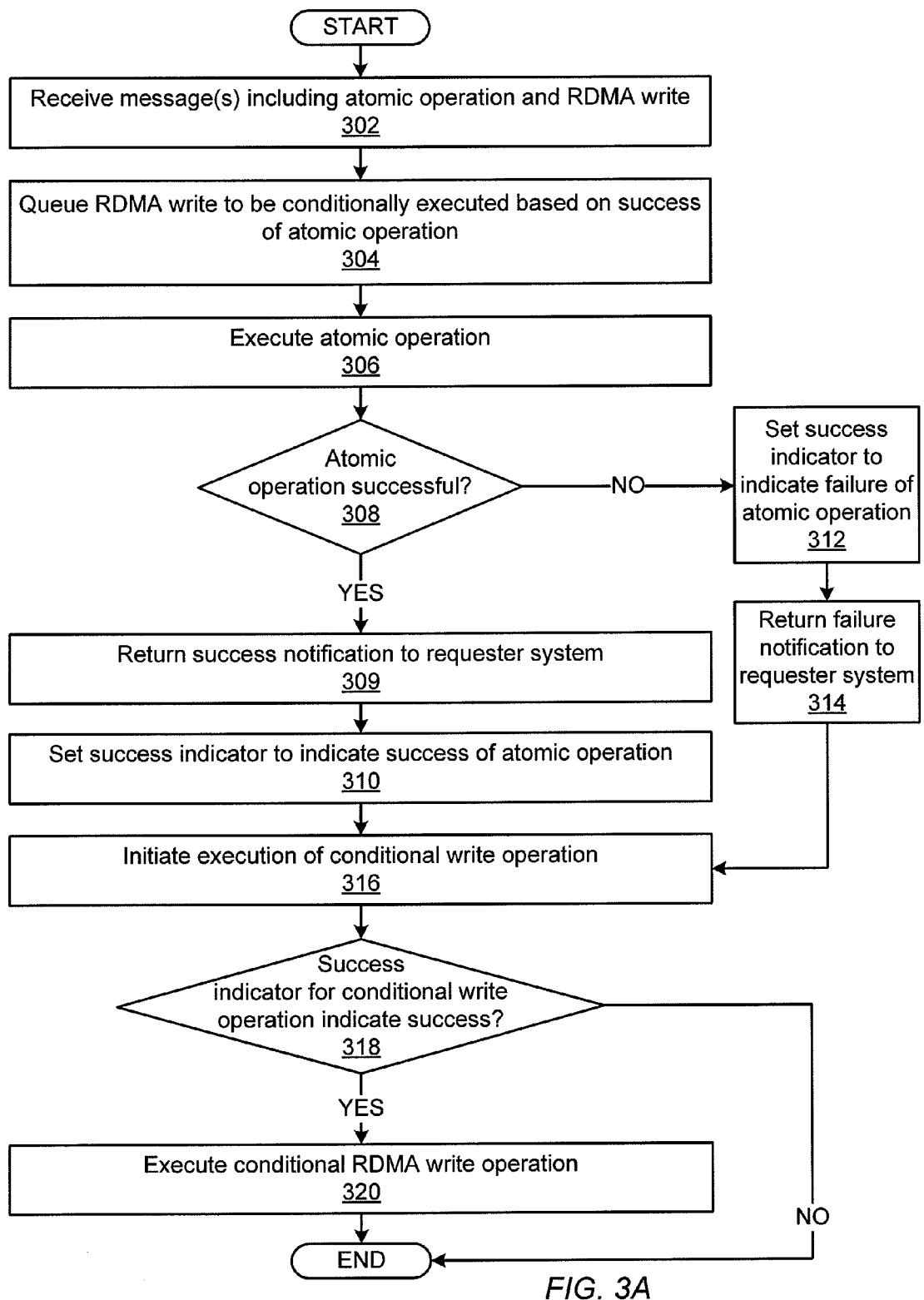
FIGS. 3A-3B show flowcharts in one or more embodiments of the invention.
Figure 3B:
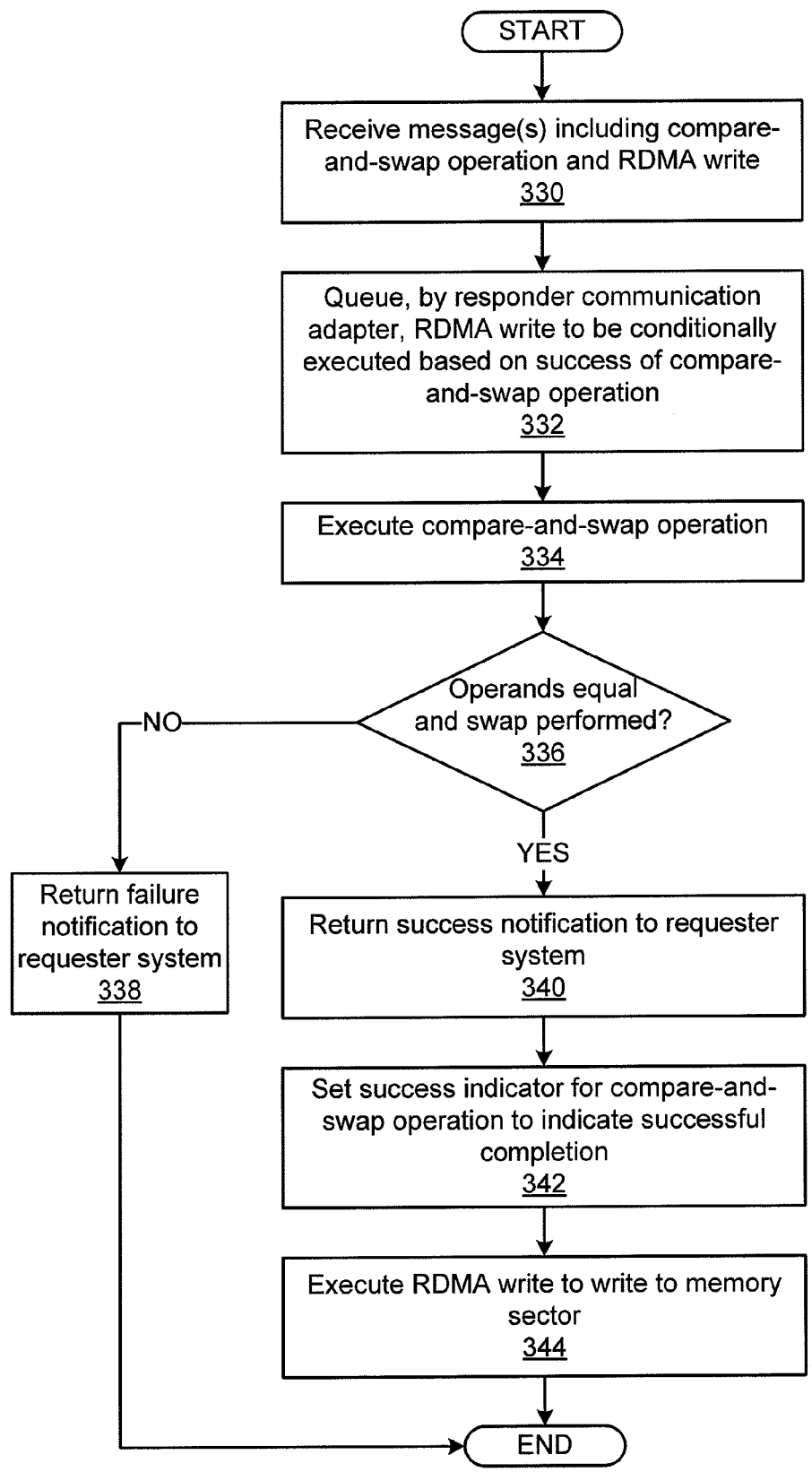

FIGS. 3A-3B show flowcharts of a method for conditional RDMA write in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 3A-3B, may be included in performing this method. Accordingly, the specific arrangement of steps shown in FIGS. 3A-3B should not be construed as limiting the scope of the invention.

FIG. 3A shows a flowchart of a method for performing a conditional RDMA write based on the success of an atomic operation. In one or more embodiments of the invention, the Steps shown in FIG. 3A may be performed by a responder system.

In Step 302, one or more message(s) requesting an atomic operation and an RDMA write are received. For example, one message may request the atomic operation while another message may request the RDMA write. If multiple messages are sent, the messages may be sent consecutively or non-consecutively. For example, the requester system may send the first message with the atomic operation and then microseconds or an hour later, the requester system may send a second message with the RDMA write. In one or more embodiments of the invention, the RDMA write message does not expressly refer to the atomic operation. For example, the requester may send the RDMA write to a memory location associated with a descriptor. The descriptor may define the RDMA write as conditional RDMA write that is dependent on the atomic operation. Alternatively, both requests may be combined into a single message. Specifically, the requester may queue work requests for an atomic operation. In this case, the atomic operation may be used for performing a memory operation at a memory sector of the responder device.

In Step 304, the RDMA write is queued to be conditionally executed based on the success of the atomic operation. Specifically, the responder communication adapter queues the RDMA write to be conditionally executed based on whether the atomic operation results in a success. In one or more embodiments of the invention, queuing the RDMA write includes obtaining the descriptor for the RDMA write. The descriptor identifies the RDMA write as being a conditional RDMA write. Further, the descriptor may identify the conditional RDMA write as being dependent on the atomic operation. Based on the conditional RDMA write being dependent on the atomic operation, the conditional RDMA write is queued to execute after the atomic operation if the atomic operation is successfully completed.

As an alternative, the descriptor may identify the conditional RDMA write as being dependent on an atomic operation in a queue pair without specifying on which particular atomic operation the conditional RDMA write is dependent. In such a scenario, the conditional RDMA write may be associated with an executable indicator that indicates when the conditional RDMA write may be executed. The executable indicator may be the success bit or other indicator that is triggered, at least in part, by the status of the success bit. Thus, the executable indicator for the conditional RDMA write may be set only when all outstanding atomic operations associated with a queue pair are first executed (and any other conditions for executing the conditional RDMA write are satisfied). If the executable indicator is not set, then the conditional RDMA write cannot execute. Determining whether all outstanding atomic operations have executed may be performed using a counter that maintains a count of outstanding atomic operations.

In one or more embodiments of the invention, an opcode in the RDMA write may indicate that the RDMA write is a conditional RDMA write. The opcode may additionally specify the atomic operation on which the conditional RDMA write is dependent. In such a scenario, the opcode may be used by the responder system to queue the RDMA write.

In Step 306, the atomic operation is executed in one or more embodiments of the invention. In one or more embodiments of the invention, the responder communication adapter executes the atomic operation. For example, the responder communication adapter may perform memory operations on the responder device to execute the atomic operations.

In Step 308, a determination is made as to whether the execution of the atomic operation is successful. If the atomic operation execution of the atomic operation is successful, a success notification is returned to the requester system in one or more embodiments of the invention (Step 309). The returning of the success notification to the requester system implicitly also informs the requester system that the conditional RDMA write will execute. Accordingly, a subsequent success notification of the conditional RDMA write may be omitted in one or more embodiments of the invention. Further, the success indicator is set to indicate the success of the atomic operation (Step 310).

If the execution of the atomic operation is not successful, then the success indicator is set to indicate that the atomic operation is not successful (Step 312). Step 312 may be optionally performed as the step may be omitted if the success indicator is preset to indicate that the atomic operation is not successful. For example, if the success indicator is a success bit, the success bit may be set to false while the atomic operation is executing and only set to true if and when the execution of the atomic operation is successfully completed. In Step 314, a failure notification is returned to the requester system in one or more embodiments of the invention. The returning of the failure notification to the requester system implicitly also informs the requester system that the conditional RDMA write did not execute. Accordingly, a subsequent failure notification of the conditional RDMA write may be omitted in one or more embodiments of the invention.

Continuing with FIG. 3A, the execution of the conditional RDMA write is initiated (Step 316). In one or more embodiments of the invention, initiating the execution of the conditional RDMA write causes the communication adapter to determine that the operation is a conditional RDMA write. In response, the communication adapter checks the success indicator corresponding to the conditional RDMA write. For example, the conditional RDMA write may include the communication channel identifier or message identifier of the atomic operation. The communication adapter may identify status information for the atomic operation and read the success indicator from the status information.

In Step 318, a determination is made whether the success indicator for the conditional RDMA write indicates successful completion of the atomic operation. If the status indicator does not indicate successful completion, then the conditional RDMA write is not executed. Specifically, the conditional RDMA write is dropped.

Continuing with FIG. 3A, if the success indicator indicates a successful completion of the atomic operation, the conditional RDMA write is executed (Step 320). Specifically, the responder communication adapter performs the RDMA write to write a specified modification to memory on the responder device. In one or more embodiments of the invention, the work request for an RDMA write includes a list of local buffer segments and a virtual address of the remote memory location, where data from the local buffer segments is written to the remote memory location. In this case, the local buffer segments should refer to the address space of the requester device, and the virtual address should refer to the address space of the responder device.

In one or more embodiments of the invention, although FIG. 3A shows that the conditional RDMA write is received and queued before execution of the atomic operation, the conditional RDMA write may be received during or after execution of the atomic operation. Similarly, the queuing of the conditional RDMA write may be performed during or after the execution of the atomic operation.

FIG. 3B shows a flowchart of a method for performing an RDMA conditional write based on the success of a compare-and-swap atomic operation in accordance with one or more embodiments of the invention. Specifically, the flowchart shown in FIG. 3B provides an example of using the conditional RDMA write for the purpose of sector atomics. Sector atomics allows for multiple possible clients (e.g., requester systems) to update a memory sector while ensuring that only one client has access to the memory sector at any given time and will update the memory sector with the most recent data.

In particular, to perform the sector atomics, the memory sector that is modifiable by multiple clients has two corresponding version identifiers. The first version identifier gives a requester the right to update the memory sector to a new version. The second version identifier is updated after the memory sector is updated to the new version. For example, consider the scenario in which the memory sector is in version N. A requester may obtain the right to update the memory sector by changing the value of the first version identifier from N to N+1. Then, the requester can have the memory sector updated by writing to the memory sector. After the content of the memory sector is updated and as part of the writing, the second version identifier is updated in one or more embodiments of the invention. Thus, when the two version identifiers are equal, then the memory sector is deemed to be in a consistent state. In other words, the memory sector is not in the progress of being updated.

To ensure that the memory sector is in a consistent state, a requester may issue an RDMA read. If the first version number and the second version number are not equal, a determination is made that the memory sector is in an inconsistent state (i.e., an unfinished write or modification is currently being performed on the memory sector). Accordingly, the requester intermittently reissues the RDMA read, without issuing the compare-and-swap and conditional RDMA write, until the memory sector is in a consistent state.

Rather than using two version identifiers, a single version number may be used as an initial seed or modifier for a cyclic redundancy code as described in U.S. patent application Ser. No. 13/215,377, entitled "Method and System for Requester Virtual Cut Through" and filed on Aug. 23, 2011. U.S. patent application Ser. No. 13/215,377 is incorporated herein by reference.

In Step 330, one or more messages requesting a compare-and-swap operation and an RDMA write are received. For example, if the operations are sent using the Infiniband® network, the requester may queue work requests for a compare-and-swap operation and an RDMA write (i.e., update and commit) in the send queue of the queue pair to initiate the message. In this case, the compare-and-swap operation may be to (1) determine whether the operands (a memory location and a value) of the compare-and-swap operation are equal and (2) if the operands are equal, setting the value of a version number to a new value on the responder device. The compare-and-swap operation is performed atomically (i.e., completely executed without other operations being executed on the same memory sector). The compare-and-swap operation may be performed to confirm that the next version of the memory sector is same as expected. For example, the operands may be the current version number of the memory sector and the expected version number. By performing the compare-and-swap operation, the requester ensures that the requester is updating the memory sector with the most recent data.

In Step 332, the RDMA write is queued at the responder communication adapter to be conditionally executed based on the success of the compare-and-swap. Specifically, when the responder communication adapter receives the RDMA write, the responder communication adapter queues the RDMA write to be conditionally executed based on the success indicator corresponding to the compare-and-swap operation. In one or more embodiments of the invention, the RDMA write includes updated content to write to the memory sector.

In Step 334, the compare-and-swap operation is executed to modify the version number associated with the memory sector. As discussed above, the compare-and-swap operation includes operands. In one or more embodiments of the invention, the operands include a compare value, a new version number, and a location in a memory sector.

Continuing with the compare-and-swap operation, the compare-and-swap operation is executed (1) to determine whether the compare value and the first version number are equal; and (2) if the compare value and the first version number are equal, to set the first version number to a new version number on the responder device. For the purposes of this application, determining whether the compare value and the first version number are equal is the same as determining whether a compare value that identifies a new version number is equal to the first version number plus one. Similarly, other equivalent operations are included without departing from the scope of the invention or the claims.

By setting the first version number to a new version number, the requester changes the memory sector to an inconsistent state. Because the memory sector is in an inconsistent state, other requesters cannot write to the memory sector. As discussed above, the compare-and-swap operation is executed atomically to ensure that the memory sector is not affected by other processes during the compare-and-swap operation.

In Step 336, a determination is made as to whether (1) the compare value and the first version number are equal and (2) the compare-and-swap operation is performed. If the compare-and-swap operation is not successfully completed, then the success indicator may be set to indicate the result is failure. Additionally, a failure notification may be returned to the requester in Step 338. If the execution of the compare-and-swap operation is successful, a success notification may be returned to the requester in Step 340. Additionally, in Step 342, the success indicator of the compare-and-swap operation is set to indicate successful completion of the compare-and-swap operation in one or more embodiments of the invention.

In response to the success indicator of the compare-and-swap operation being set to indicate successful completion, the RDMA write is executed (Step 344). The execution of the RDMA write writes updated content to the memory sector. Additionally, the second version number may be updated to reflect that the new version of content is completely written to the memory sector.

Optionally, the requester may issue an additional RDMA read to confirm that the compare-and-swap operation resulted in a consistent memory sector. If the first version number and the second version number are not equal, a determination is made that the memory sector is in an inconsistent state (i.e., an unfinished write or modification is currently being performed on the memory sector). If the memory sector is in an inconsistent state, the compare-and-swap operation and the RDMA write may be invalidated (i.e., designated as unsuccessful) and then reattempted as discussed above.

FIG. 4A shows an example diagram for performing a conditional RDMA write that is dependent on an atomic operation in one or more embodiments of the invention. In one or more embodiments of the invention, one or more of the steps shown in FIG. 4A may be omitted, repeated, and/or performed in a different order than that shown in FIG. 4A. Accordingly, the specific arrangement of steps shown in FIG. 4A should not be construed as limiting the scope of the invention. The following example is provided for exemplary purposes only and accordingly should not be construed as limiting the invention.

In Step 410, a message with an atomic operation is sent from the requester host channel adapter (HCA) (402) to the responder HCA (404). Specifically, the message may be sent from the send queue of the requester HCA (402) to the receive queue of the responder HCA (404). Thus, the atomic operation is directed to a queue pair of the responder.

In response to receiving the message, the responder HCA (404) processes the message. In this case, the responder HCA (404) may process atomic operation by queuing the atomic operation (Step 412). When the atomic operation is ready to be executed, the atomic operation is executed (Step 414).

In Step 416, similar to the atomic operation, a message with a conditional RDMA write is sent from the requester host channel adapter (HCA) (402) to the responder HCA (404). Specifically, the message may be sent from the send queue of the requester HCA (402) to the receive queue of the responder HCA (404). Thus, the conditional RDMA write is directed to a queue pair of the responder.

For the purpose of the example, consider the scenario where the atomic operation successfully executes. Once the atomic operation successfully completes execution, a notification of the successful execution is sent to the requester HCA (Step 418).

In one or more embodiments of the invention, at the same time, initial processing of the conditional RDMA write is performed. Specifically, in Step 420, a descriptor for the RDMA write is obtained. From the descriptor, a determination is made that the RDMA write is a conditional RDMA write. Accordingly, the RDMA write is queued and the status of the atomic operation is checked. Because the status of the atomic operation is that the atomic operation successfully completed, the conditional RDMA write is performed with the responder memory (406) in Step 422.

The condition RDMA write as described above may reduce the requester and responder latency as the requester does not need to wait to send the conditional RDMA write. Accordingly, the RDMA write may be performed immediately or shortly after the atomic operation completes. Further, in embodiments where the descriptor is used to identify an RDMA write as a conditional RDMA write, existing RDMA write protocols do not need to be changed.

Figure 4B:
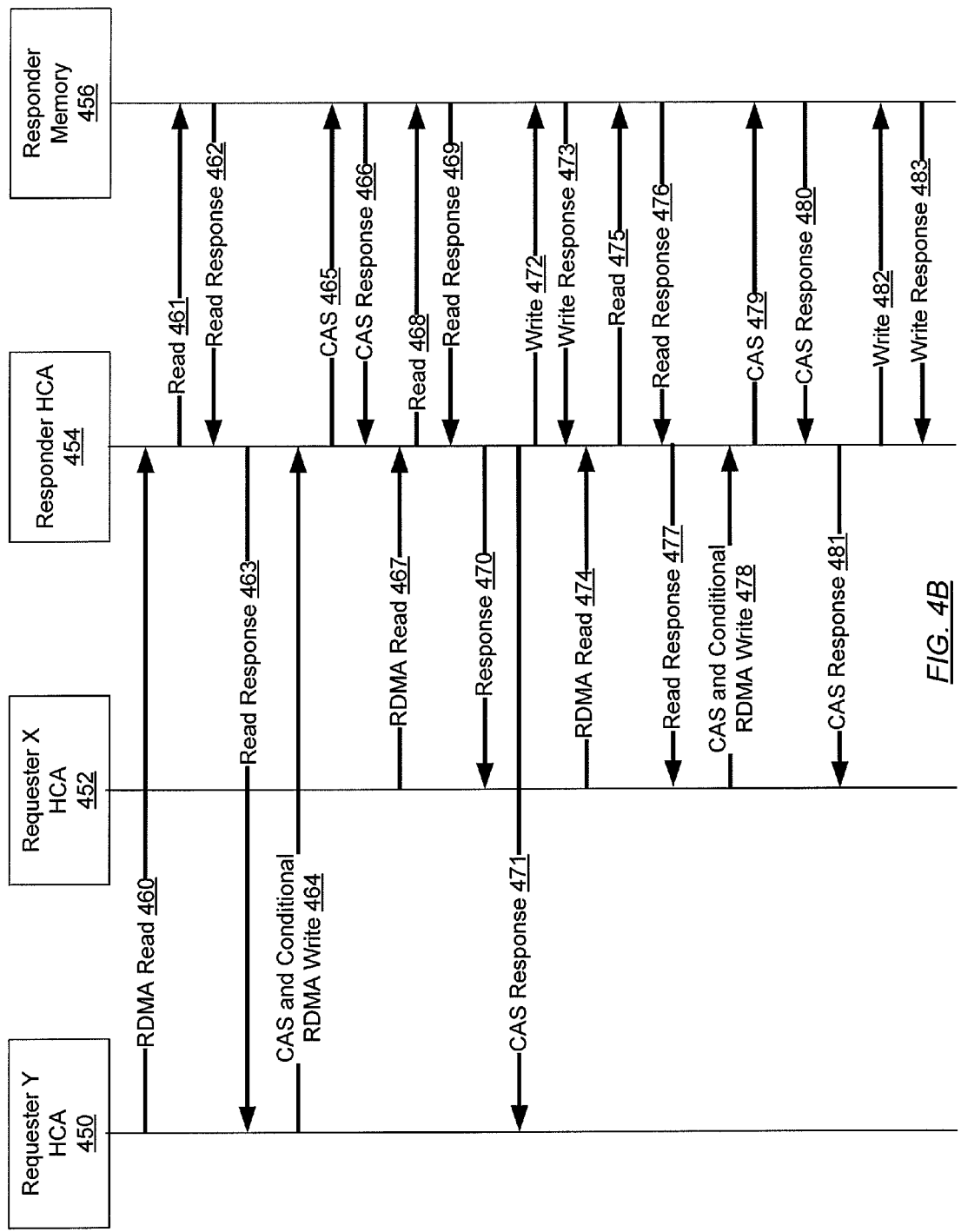

FIG. 4B shows an example flowchart for a compare-and-swap atomic operation and a conditional RDMA write in an Infiniband® network in accordance with one or more embodiments of the invention. In one or more embodiments of the invention, one or more of the steps shown in FIG. 4B may be omitted, repeated, and/or performed in a different order than that shown in FIG. 4B. Accordingly, the specific arrangement of steps shown in FIG. 4B should not be construed as limiting the scope of the invention. The following example is provided for exemplary purposes only and accordingly should not be construed as limiting the invention.

In the following example and in FIG. 4B, the use of the acronym "CAS" is equivalent to "compare-and-swap". Additionally, in the following example, consider the scenario in which a Requester Y HCA (450) and a Requester X HCA (452) may write to the same memory sector on a responder system. The responder system has a Responder HCA (454) and a responder memory (456). The responder memory includes a memory sector. Specifically, for the purpose of the example, consider the scenario in which the following is stored on the Responder memory (456): {VersionID1, sector data, VersionID2}, where VersionID1 is a first version identifier, VersionID2 is a second version identifier, and sector data is the contents of the memory at the particular memory sector. Continuing with the example, consider the scenario in which, initially, VersionID1 is equal to VersionID2 is equal to N. In other words, the memory sector is in a consistent state initially and the version number is N.

Turning to FIG. 4B, in Step 460, Requester Y HCA (450) issues an RDMA read of VersionID1, sector data, and VersionID2 in order to determine the next version, whether the memory sector is in a consistent state, and the content of the memory sector. In Step 461, Responder HCA (454) issues the read operation to the memory sector and receives a response in Step 462 that VersionID1 is equal to N, VersionID2 is equal to N, and sector data. In Step 463, the Responder HCA (454) responds to Requester Y HCA (450) with the read response from the responder memory (456).

In Step 464, because VersionID1 equals Version ID2 equals N, Requester Y HCA (450) issues a CAS operation to Responder HCA (454) to reserve the right to update the memory sector to version N+1. The CAS operation may include a compare value of N and a new value of N+1. Requester Y HCA (450) may also issue a conditional RDMA write at this time or later. For the purpose of the example, consider the scenario in which the conditional RDMA write is submitted with the CAS operation.

Responder HCA (454) receives the CAS operation and the conditional RDMA write. Responder HCA (454) queues the conditional write to execute only after the success indicator for the CAS operation results in a success. Further, Responder HCA (454) executes the CAS operation in Step 465. Executing the compare and swap operation checks to see if VersionID1 equals the compare value of N. If VersionID1 equals N, then VersionID1 is set to be equal to N+1 (i.e., the new value in the CAS operation), and the CAS operation results in a success. If VersionID1 does not equal N, then the CAS operation results in failure. In the example, the CAS operation is successful and the Responder HCA receives the response in Step 466.

Continuing with the example, in the meantime, in Step 467, Requester X HCA (452) issues an RDMA read of VersionID1, sector data, and VersionID2 in order to determine the next version, whether the memory sector is in a consistent state, and the content of the memory sector. In Step 468, the read operation is performed and a response is issued in Step 469. The response in Step 469 indicates that VersionID1 is equal to N+1 and VersionID2 is equal to N. Accordingly, in Step 470, Responder HCA (454) responds to Requester X HCA (450) that VersionID1 equals N+1, VersionID2=N, and sector data. Because VersionID1 does not equal Version ID2, Requester X HCA (452) ignores the received sector data and does not issue CAS operation to Responder HCA (454). Instead, Requester X HCA (452) continues to request the RDMA read operation until a consistent state is identified.

In the meantime, Responder HCA (454) may respond to Requester Y HCA (45) with notification of successful completion of the CAS operation in Step 471. Further, in Step 472, Responder HCA (454) executes Requester Y HCA (450) conditional RDMA write based on success of Requester Y HCA (450) CAS operation. The execution of the conditional RDMA write results in writing data to the sector and updating VersionID2 to N+1. At this stage, VersionID2 equals VersionID1, which equals N+1. A write response may be returned in Step 473. Although not shown, Requester Y HCA (450) may issue a subsequent RDMA read to confirm that VersionID2 is equal to VersionID1 and N+1.

In Step 474, Requester X HCA (452) issues another RDMA read operation of VersionID1 and VersionID2 in order to determine the next version and the content of the sector data. The read is issued to the Responder Memory (456) in Step 475, a response is returned in Step 476, and forwarded to the Requester X HCA in Step 477. Because at this stage, VersionID1 equals N+1 and VersionID2 equals N+1, Requester X HCA may use the sector data to update the sector data. For example, Requester X HCA may identify itself as having a newer version of the sector data. Accordingly, in Step 478, Requester X HCA (452) issues CAS operation to Responder HCA (454) to reserve right to update sector to N+2. Requester X HCA (452) may also issue a conditional RDMA write.

Responder HCA (454) receives the Requester Y HCA (450) CAS operation and the conditional RDMA write. Responder HCA (454) queues the conditional RDMA write and executes the CAS operation in Step 479. As discussed above, executing the CAS operation checks to see if VersionID1 equals the compare value of N+1 and, if so, updates VersionID1 to the new value in the CAS operation of N+2. Because the memory sector is in a consistent state and VersionID1 is equal to N+1, a successful notification is sent in Step 480 and forwarded in Step 481. In Step 482, based on successful execution of CAS operation, Responder HCA (454) executes Requester X HCA (452) RDMA write. The execution of the conditional RDMA write results in writing data to the sector and updating VersionID2 to N+2. At this stage, VersionID2 equals VersionID1, which equals N+2. A response may be returned in Step 483.

By way of a variation of FIG. 4B, consider the scenario in which before Step 464 and after Step 463, Requester X HCA (452) issues the RDMA read operation. In such a scenario, the response to the initial RDMA read operation of both Requester Y HCA (450) and Requester X HCA (452) is that VersionID1 is equal to VersionID2, which is equal to N. Therefore, both Requester Y HCA (450) and Requester X HCA (452) may issue the same CAS operation with a compare value of N and a conditional RDMA write. However, because the CAS operation is an atomic operation that updates VersionID1 to N+1, the first CAS operation that is executed succeeds while the second CAS operation fails. In other words, after the first CAS operation is executed, VersionID1 does not equal the compare value of N in the second CAS operation. Because the second CAS operation fails, a failure notification is returned to the requester requesting the second CAS operation and the conditional RDMA write corresponding to the second CAS operation is not executed.

The conditional RDMA write as described above may reduce the requester and responder latency from three to two round-trip times ("RTT"). Further, the conditional RDMA write may significantly reduce the time the sector is in an inconsistent state from a single RTT to the time the HCA requires to determine the success of the RDMA compare-and-swap operation and write the payload of the conditional RDMA write to memory (e.g., in the order of 500 ns).

The RTT resulting from the initial RDMA read operation may be alleviated by maintaining a hint-cache of the remote sectors. The maintenance of a hint-cache is dependent on the memory consumption of the caches. If memory consumption is an issue, the optimization may still be applied to a hot-set of sectors.

Updating the hint-cache may require another HCA extension, a multicast, zero-based-virtual-address (ZBVA) RDMA write. In this case, the clients updating the sectors would be members of a multicast group. A successful update would be augmented by posting an RDMA write to the multicast group. The RDMA write to all the other systems would likely succeed and update the sector entries of the hint-caches.

The modification of the memory sector could then be performed by a read operation of the local hint-cache. The read operation may then be used to retrieve a consistent copy of the sector, although not necessarily the current one. Based on the sector data obtained from the hint-cache, the modification of the memory sector may determine a new version number of the sector and the contents of the data portion. The HCA may then perform the compare-and-swap operation, the conditional RDMA write, and potential the RDMA read as discussed above. If the modification of the sector succeeds, the HCA will post the multicast, ZBVA, RDMA write in order to update the remote hint caches, as well as updating the responder's local hint cache.

Assuming the hint-cache most often returns the correct copy of the remote sector, the latency of the modification to the memory sector may be reduced to a single RTT.

Embodiments of the invention may be implemented on virtually any type of computer regardless of the platform being used. For example, a computer system may include one or more processor(s) (e.g., an integrated circuit, central processing unit, or other hardware processor), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers (not shown). The computer system may also include input means, such as a keyboard, a mouse, or a microphone (not shown). Further, the computer system may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a network interface connection (not shown).

Those skilled in the art will appreciate that many different types of computer systems exist, and the aforementioned input and output means may take other forms, now known or later developed. Generally speaking, the computer system includes at least the minimal processing, input, and/or output means necessary to particularly practice embodiments of the invention.

Further, those skilled in the art will appreciate that one or more elements of the aforementioned computer system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conditional execution of a remote direct memory access (RDMA) write, the method comprising:
   receiving, by a host channel adapter, at least one message comprising an atomic operation and the RDMA write from a requester system, wherein the RDMA write is to write to a memory location on a host connected to the host channel adapter;
   obtaining, by the host channel adapter, a descriptor corresponding to the RDMA write;
   determining, from the descriptor, that the RDMA write is a conditional RDMA write conditioned on a successful execution of the atomic operation;
   queuing, based on determining that the RDMA write is the conditional RDMA write, the conditional RDMA write to be conditionally executed based on a success indicator of the atomic operation;
   executing, after queuing the conditional RDMA write, the atomic operation, wherein execution of the atomic operation is successful;
   maintaining, by the host channel adapter, a state of the atomic operation by setting the success indicator to indicate the successful execution of the atomic operation when execution of the atomic operation is successfully completed; and
   in response to setting the success indicator to indicate the successful execution, executing, by the host channel adapter, the conditional RDMA write to write to the memory location on the host.

2. The method of claim 1, wherein the RDMA write is directed to a queue pair, and wherein queuing the conditional RDMA write comprises queuing the RDMA write to execute only after all outstanding atomic operations for the queue pair execute.

3. The method of claim 1, further comprising:
   obtaining, by the host channel adapter, the descriptor from the host.

4. The method of claim 1, wherein the atomic operation is a compare-and-swap operation, wherein successful execution is when (1) a compare portion of the compare-and-swap operation determines that a compare value of the compare-and-swap operation is equal to a first version number and (2) a swap portion of the compare-and-swap operation is executed to change the first version number to a new version number specified in the compare-and-swap operation.

5. The method of claim 4, further comprising:
   performing a first RDMA read of the memory location to confirm that a consistent copy of the memory location is obtained; and
   performing a second RDMA read of the memory location to confirm that the atomic operation resulted in the consistent copy of the memory location,
   wherein the atomic operation is executed in response to determining that the consistent copy of the memory location is obtained.

6. The method of claim 5, wherein the consistent copy is confirmed when the first version number preceding the memory location is equal to a second version number following the memory location.

7. The method of claim 1, wherein the atomic operation is included in a first packet and the RDMA write is included in a second packet, and wherein the first packet is queued on a receive queue of a queue pair before the second packet.

8. A responder communication adapter for conditional execution of a remote direct memory access (RDMA) write comprising:
   a network port configured to:
      receive at least one message comprising a request to perform an atomic operation and the RDMA write from a requester system, wherein the RDMA write is to write to a memory location on a host connected to the responder communication adapter;
   a responder processing logic connected to the network port and configured to:
      obtain a descriptor corresponding to the RDMA write;
      determine, from the descriptor, that the RDMA write is a conditional RDMA write conditioned on a successful execution of the atomic operation;
      queue, based on determining that the RDMA write is the conditional RDMA write, the conditional RDMA write to be conditionally executed based on a success indicator of the atomic operation;
      execute, after queuing the conditional RDMA write, the atomic operation resulting in the successful execution;
      maintain a state of the atomic operation by setting the success indicator to indicate the successful execution of the atomic operation when execution of the atomic operation is successfully completed; and
      in response to setting the success indicator to indicate the successful execution, execute the conditional RDMA write to write to the memory location on the host.

9. The responder communication adapter of claim 8, wherein the responder processing logic comprises:
   a descriptor fetch module for obtaining the descriptor.

10. The responder communication adapter of claim 8, wherein the responder processing logic comprises:
    a DMA validation module configured to:
       determine the state of the atomic operation by accessing the success indicator; and
       execute the conditional RDMA write only after determining that the state of the atomic operation is successfully completed.

11. The responder communication adapter of claim 8, wherein the responder communication adapter is a host channel adapter.

12. The responder communication adapter of claim 8, wherein the success indicator is a success bit, and wherein the success indicator is set to indicate successful completion when the success bit is set to true.

13. The responder communication adapter of claim 12, wherein the atomic operation is a compare-and-swap operation.

14. The responder communication adapter of claim 13, wherein the success bit is set to true when (1) a compare portion of the compare-and-swap operation determines that a compare value of the compare-and-swap operation is equal to a first version number and (2) a swap portion of the compare-and-swap operation is executed to change the first version number to a new version number specified in the compare-and-swap operation.

15. The responder communication adapter of claim 8, wherein the atomic operation is included in a first packet and the RDMA write is included in a second packet, and wherein the first packet is queued on a receive queue of a queue pair before the second packet.

16. A non-transitory computer readable medium storing instructions for conditional execution of a remote direct memory access (RDMA) write, the instructions comprising functionality for causing a computer system to:
receive at least one message comprising an atomic operation and the RDMA write from a requester system, wherein the RDMA write is to write to a memory location on a host connected to a host channel adapter;
obtain a descriptor corresponding to the RDMA write;
determine, from the descriptor, that the RDMA write is a conditional RDMA write conditioned on a successful execution of the atomic operation;
queue, based on determining that the RDMA write is the conditional RDMA write, the conditional RDMA write to be conditionally executed based on a success indicator of the atomic operation;
execute, after queuing the conditional RDMA write, the atomic operation resulting in the successful execution;
maintain a state of the atomic operation by setting the success indicator to indicate the successful execution of the atomic operation when execution of the atomic operation is successfully completed; and
in response to setting the success indicator to indicate the successful execution, execute the conditional RDMA write to write to the memory location on the host.

17. The non-transitory computer readable medium of claim 16, wherein the instructions further comprise functionality to:
perform a first RDMA read of the memory location to confirm that a consistent copy of the memory location is obtained; and
perform a second RDMA read of the memory location to confirm that the atomic operation resulted in the consistent copy of the memory location,
wherein the atomic operation is executed in response to determining that the consistent copy of the memory location is obtained.

18. The non-transitory computer readable medium of claim 17, wherein the consistent copy is confirmed when a first version number preceding the memory location is equal to a second version number following the memory location.

19. The non-transitory computer readable medium of claim 18, wherein the atomic operation is a compare-and-swap operation, wherein successfully completing execution is when (1) a compare portion of the compare-and-swap operation determines that a compare value of the compare-and-swap operation is equal to the first version number and (2) a swap portion of the compare-and-swap operation is executed to change the first version number to a new version number specified in the compare-and-swap operation.

20. The non-transitory computer readable medium of claim 16, wherein the instructions further comprise functionality to:
obtain the descriptor from the host.

\* \* \* \* \*